(12) United States Patent
Yousefi'zadeh et al.

(10) Patent No.: US 9,560,493 B2
(45) Date of Patent: Jan. 31, 2017

(54) OPERATIONAL NETWORK PLANNING

(71) Applicant: The Boeing Company, Huntington Beach, CA (US)

(72) Inventors: Homayoun Yousefi'zadeh, Irvine, CA (US); Paul P. Han, Santa Ana, CA (US); James A. Julian, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 14/661,891

(22) Filed: Mar. 18, 2015

(65) Prior Publication Data

US 2016/0337820 A1    Nov. 17, 2016

Related U.S. Application Data

(60) Provisional application No. 61/955,008, filed on Mar. 18, 2014.

(51) Int. Cl.
*H04B 7/00* (2006.01)
*H04W 4/08* (2009.01)
*H04W 16/18* (2009.01)
*H04L 12/18* (2006.01)

(52) U.S. Cl.
CPC ............ *H04W 4/08* (2013.01); *H04L 12/189* (2013.01); *H04L 12/1877* (2013.01); *H04W 16/18* (2013.01)

(58) Field of Classification Search
CPC ........ H04W 16/18; H04W 4/001; H04W 4/02; H04W 4/206; H04W 72/10
USPC ............... 455/518, 519, 500, 517, 509, 450, 452.1,455/446, 454, 422.1, 403, 67.11, 423–425,455/550.1, 507, 508, 514, 515, 521, 404.1,455/404.2; 370/254, 235, 255, 328, 329, 343, 370/338
See application file for complete search history.

(56) References Cited

U.S. PATENT DOCUMENTS

| 7,542,436 | B2 | 6/2009 | El-Damhougy |
| 7,779,449 | B2 | 8/2010 | Pham |
| 7,950,058 | B1 * | 5/2011 | Rockwood .......... H04L 63/1416 726/23 |

OTHER PUBLICATIONS

DOD Programs; Joint Tactical Radio Systems (JTRS) Network Enterprise Domain (NED) Network Managers; 2012; pp. 57-60 http://www.dote.osd.mil/pub/reports/FY2012/pdf/dod/2012jtrsned.pdf.

(Continued)

*Primary Examiner* — Keith Ferguson
(74) *Attorney, Agent, or Firm* — Womble Carlyle Sandridge & Rice LLP (57) ABSTRACT

An apparatus is provided for implementation of an operational network planning system. The apparatus may receive importation of a unit task organization (UTO) and form waveform(s) based thereon. For each waveform, the apparatus may assign radio(s) to the waveform, present a set of questions that elicit a set of answers, and in response, receive a set of answers that describe a radio frequency environment of the waveform. The apparatus may automatically then populate a set of properties of the waveform based on the radio frequency environment described by the set of answers, and based on a number of the radio(s) assigned to the waveform. The apparatus may assign network addresses and routing protocol(s) across the radios assigned to the waveform(s), and generate a network design based on the waveform(s), and the above artifacts related thereto.

21 Claims, 6 Drawing Sheets

(56) References Cited

OTHER PUBLICATIONS

Integrated Tactical Networking Environment (ITNE) concept of Operations (CONOPS); Signal Center of Excellence (SIGCoE), TRADOC Capability Manager Tactical Radios (TCM-TR), Ft. Gordon, GA 30905; Version 1.0; Jul. 8, 2013 (61 pgs.)
LTC Gregory Crzybowski; United States Army Signal Regiment; Integrated Tactical Networking Environment (ITNE); ITNE Concept of Operations, ITNE Capability Requirements, TCM-TR (Tactical Radios) (48 pgs.).
Organization of the United States Army; Department of the Army Pamphlet 10-1; Headquarters, Department of the Army, Washington, DC; Jun. 14, 1994 (80 pgs.).

* cited by examiner

OPERATIONAL NETWORK PLANNING

CROSS-REFERENCE TO RELATED APPLICATION(S)

The present application claims priority to U.S. Provisional Patent Application No. 61/955,008, entitled: Operational Network Planning, filed on Mar. 18, 2014, the content of which is incorporated by reference in its entirety.

TECHNOLOGICAL FIELD

The present disclosure relates generally to ad-hoc mobile wireless networks and, in particular, to management of ad-hoc mobile wireless networks such as operational tactical networks.

BACKGROUND

Tactical radio communications rely heavily on ad-hoc mobile radio networks and systems. Emerging tactical battlefield networks typically include a collection of autonomous host nodes or terminals that are mobile. These nodes move into and out of radio communication range with each other, and generally cannot rely on a pre-defined fixed infrastructure within their environment. The nodes in an ad-hoc communications network may move, be destroyed, or new nodes may join the network. In other words, the network environment is mobile, wireless, dynamically changing, and is "infrastructure-less."

Wireless Ad-Hoc Networks

In a wireless ad-hoc network a group of autonomous nodes or terminals communicate with each other by forming a multi-hop radio network and maintaining connectivity in a decentralized manner. The nodes represent radio communication devices which may be with a person (such as a warfighter), a ground or an air-vehicle platform, an Unmanned Air Vehicle (UAV), an Unmanned Ground Vehicles (UGV) or the like. The network can be represented by a graph, where the graph vertices are the network nodes and two vertices are connected by an edge if the corresponding nodes can be reached (or communicate) by a radio link. In other words the nodes can be depicted as a set of points. Connections between these points can be shown as lines with each line representing a radio link over which one node can communicate with another node. Two radio nodes are said to be communicating if the link quality is above a predefined threshold, such as, if the signal-to-noise ratio is above a predefined threshold.

The mobile nodes must be able to communicate with each other over a wireless media without any infra-structured network component support such as fixed radio relay base stations. Each mobile node can typically communicate with its neighboring mobile nodes which are a single radio hop away. Each mobile node operates not only as a host but also as a router, forwarding packets of information to other mobile nodes in the network that may not be within direct wireless transmission range of each other. Each node participates in an ad-hoc routing protocol that allows it to discover "multi-hop" paths through the network to any other node. Control of the network is distributed among the nodes.

The network topology is "ad-hoc" in that it dynamically changes over time because the connectivity among the nodes may vary with time. For example, because the nodes are mobile, the network topology may change rapidly and unpredictably over time due to node departures, new node arrivals, and the mobility of the nodes. Nodes can fail, for example, if they are destroyed or due to hard or soft failures which occur in the battlefield. Moreover, since the nodes communicate over wireless links, the nodes have to contend with the effects of radio communication, such as noise, fading, interference and the like. Factors such as variable wireless link quality, propagation path loss, fading, multi-user interference, power expended, topological changes and the like may become relevant issues. Connections between nodes may also be broken or established due to, for example, distance factors, variations in signal strength, weather, mountains, buildings, loss of node and the like. Thus, changes in propagation conditions and the environment, as well as the unpredictability of node movements and sporadic node failures, can contribute to the dynamic nature of an ad-hoc network. These problems are even further complicated in a military environment where the preservation of security, latency, reliability, intentional jamming and recovery from failure are significant concerns.

Accordingly, one of the most important features of any an ad-hoc mobile network, is the ability to adapt well to link changes, namely changes in the interconnectivity between mobile nodes.

Joint Tactical Radio System (JTRS)

The Joint Tactical Radio System (JTRS) is a Department of Defense (DoD) initiative designed to provide a flexible new approach to meet diverse warfighter communications needs through software-programmable tactical radio technology or "software defined radios" (SDRs). It is desirable to provide SDRs which can provide a warfighter with voice, data and video communications across a battlespace. Beyond the battlefield, JTRS holds great potential for initiatives such as homeland security, federal, state and local law enforcement, search and rescue, commercial aviation and international commercial applications. The JTRS implements the concept of relay and translation nodes (land, sea, air and space based) to help ensure that tactical users can access required information no matter where it resides.

There are several issues facing dynamic ad-hoc networks. For example, links between nodes are the frequently broken as nodes move or are destroyed. In addition, nodes can randomly fail due to enemy or unintentional attacks.

Thus, a challenge in ad-hoc networks is to maintain network-wide connectivity. In this context a network is "connected" if there is a communication path, either node-to-node or multiple-node-hopping, which can allow any two nodes in the network to communicate with one another. As noted above, as nodes move the links between the nodes can be broken and the network can partition into isolated sub-networks. A break in the network can create a situation where the node cannot communicate with another node (absolutely no paths). In this case, the network is said to be "partitioned."

A number of tools have been developed to assist with network planning and management of ad-hoc radio networks, such as operational tactical networks. DoD programs such as JTRS Enterprise Network Manager (JENM), Soldier Radio Waveform (SRW) Network Manager (SRWNM), and JTRS Wideband Networking Waveform (WNW) Network Manager (JWNM) have designed and implemented planning and configuration tools requiring complex input XML files in the form of Communications Plans (CommPlans). The input files typically include hundreds of parameter types and thousands of parameter values to plan waveforms such as SRW, Mobile User Objective System (MUOS), or WNW running on radio types such as Handheld, Manpack, Small Form Fit (HMS) or Mid-Tier Networking Vehicular Radio (MNVR). Here, a waveform represents a partial implementation of a communication networking covering one or more layers of a multilayer protocol stack. In one example, a waveform may cover the bottom three layers of the Open Systems Interconnection model (OSI), namely, the physical layer, data link layer, and partial or complete network layer.

Recent releases of JENM have provided editors allowing a network planner to fully create a CommPlan from scratch or to modify an existing CommPlan. Due to lack of usability requirements, the use of such editors is limited by design to expert engineering personnel trained on the technical network planning, configuration, and operation. It has been observed in several Network Integration Evaluation (NIE) events that creating a CommPlan for a medium size mission consisting of tens of radios hosting WNW waveform and hundreds of radios hosting SRW waveform can take up to two dedicated work weeks of a team of six highly trained engineers. Accounting for other threshold waveforms, e.g., WNW and MUOS, and adding objective waveforms such as Tactical Targeting Network Technology (TTNT) and Adaptive Networking Wideband Waveform (ANW2) as well as legacy waveforms such as Single Channel Ground and Airborne Radio System (SINCGARS) and Satellite Communications (SATCOM) will only increase the time needed for creating a mission CommPlan.

As evidenced in recent NIE events held twice per year by the US Army, the inherent complexity makes the fielding of the above network management products prohibitive to the US Army operational personnel. To the best of our extensive field knowledge, there is no product in the landscape addressing the complexity of fielding of network management products having cost DoD hundreds of millions of dollars to date.

BRIEF SUMMARY

Example implementations of the present disclosure are directed to an improved system, method and computer-readable storage medium for operational network planning and management. Example implementations provide a simplified yet unique approach of mission planning applicable in military environments, but also in others. Example implementations allow operational personnel to fully plan a mission after answering a number of operationally-relevant questions.

In some example implementations, a system may be provided that offers a front-end graphical user interface (GUI) through which a mission's Unit Task Organization (UTO) may be imported. Through this GUI, capabilities such as simple drag-and-drop, military networks of multiple waveforms may be formed, and mission assets needed to populate and bridge those networks may be assigned.

Once mission networks are defined, the network planner may have an opportunity to assign the parameters of individual networks of specific waveforms, such as by selecting (e.g., double-clicking on) the associated network cloud symbol within the GUI. In this regard, selecting a network cloud construct may provide the network planner with a number of operationally-familiar questions to answer instead of having to directly populate thousands of parameters. Examples of suitable questions include network classification, operating frequency, bandwidth, the level of jamming threat, diversity tradeoff choices between throughput and reliability, the choice of network density from sparse to moderate and dense, the type of ground/air/water terrain, the urban versus non-urban development type, voice versus data application type, application domain choice, application configuration military scale (e.g., company versus platoon), and the like.

In some examples, the system may include backend business logic configured to utilize a processing engine to map user inputs to pre-populated mission parameter container templates. The system of some example implementations may utilize technology at the general/signal officer level, and may allow a graphical representation of a mission to directly translate to configuration files consumable by radios within the mission.

The system of example implementations may support planning, communications, and execution for small and large units command. In some examples, the system may be implemented as a standalone software-based tool independent of existing network management tools that can run on a number of different operating systems. In some examples, the system may be co-hosted on common hardware platforms hosting other network management tools such as JENM.

According to one aspect of example implementations, an apparatus is provided for implementation of an operational network planning system. The apparatus includes a processor and a memory storing executable instructions that in response to execution by the processor cause the apparatus to implement at least a signal analysis system and a network design system. The signal analysis system is configured to receive importation of a unit task organization for a mission, and form one or more waveforms to which radios are assigned based on the unit task organization. Formation of the waveform(s) includes for each of the one or more waveforms, the signal analysis system being configured to assign one or more radios to the waveform, present a set of questions that elicit a set of answers that describe a radio frequency environment of the waveform, and receive the set of answers in response thereto. And formation of the waveform(s) includes for each of the one or more waveforms, the signal analysis system being configured to automatically populate a set of properties of the waveform based on the radio frequency environment described by the set of answers, and based on a number of the one or more radios assigned to the waveform.

The network design system is configured to assign network addresses and one or more routing protocols across the radios assigned to the waveform(s). The network design system is configured to generate a network design based on the one or more waveforms, and assigned radio(s) and automatically populated set of properties for each of the waveform(s), and based on the assigned network addresses and routing protocol(s). The network design is in the form of a communications plan in a format from which a radio-consumable file is producible. And in some examples, the memory stores further executable instructions that in response to execution by the processor cause the apparatus to further implement a network build system configured to produce the radio-consumable file from the communications plan, with the radio-consumable file including a mission configuration file.

In some examples, the signal analysis system being configured to form waveform(s) includes being configured to develop a signal support architecture using capabilities of a graphical user interface (GUI). In these examples, the signal analysis system being configured to develop the signal support architecture includes for each of the waveform(s), the signal analysis system being configured to receive placement of a waveform onto a canvas in the GUI. The waveform represents a partial implementation of a communication networking covering at least some layers of a multilayer protocol stack.

In some further examples, the signal analysis system being configured to assign one or more radios to the waveform includes being configured to receive placement of one or more radios onto a waveform on the canvas in the GUI to thereby assign the radio(s) to the waveform.

In some further examples, the signal analysis system being configured to present the set of questions includes for each of the waveform(s), the signal analysis system being configured to receive selection of a waveform on the canvas in the GUI and in response thereto, present the set of questions that elicit the set of answers that describe the radio frequency environment of the waveform.

In some examples, the network design system being configured to assign network addresses and one or more routing protocols includes being configured to establish a network layer, including being configured to formulate a network scheme and a network routing architecture.

In some further examples, the signal analysis system being configured to form the waveform(s) includes being configured to develop a signal support architecture and radio platform preset architecture based on the unit task organization. In these examples, the network design system being configured to generate the network design includes being configured to apply the network scheme and network routing architecture to finalize the signal support architecture and radio platform preset architecture, and generate the network design based thereon.

In other aspects of example implementations, a method and computer-readable storage medium are provided for operational network management. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to management of ad-hoc mobile wireless networks such as operational tactical networks, and are even more particularly directed to planning such networks. Example implementations of the present disclosure may be described with particular reference to operational tactical networks such as an Integrated Tactical Networking Environment (ITNE), and may use terminology specific to an ITNE. It should be understood, however, that example implementations may be equally applicable to other operational tactical networks, and even other types of ad-hoc mobile wireless networks.

The ITNE operates as a tiered network including a number of functional components that, when combined, form a complete system-of-systems network capability enabling a unit commander to exchange secure and protected terrestrial and celestial voice and data across their entire formation. The ITNE is a separate logical network including specific radio frequency bands, communications security (COMSEC), and Internet Protocol (IP) address assignment that operate autonomously as required from a high-capacity backbone. The ITNE may also serve as an extension to higher-level network resources when available, and provide both a local and a global routing architecture that supports the unit commander's operational needs. In this regard, the ITNE may operate within a tactical network architecture that includes the ITNE at a lower tier (also at times known as the lower tactical Internet) and an upper tier (sometimes referred to as the upper tactical Internet. In the tactical network architecture, the ITNE and upper tier may be fully integrated to enable the flow of voice and data across both network tiers according to the unit commander's information priorities and mission parameters. More information on ITNE may be found in *Integrated Tactical Networking Environment (ITNE) Concept of Operations (CONOPS)*, US Army Signal Center of Excellence (SIGCoE): TRADOC Capability Manager Tactical Radios (TCM-TR), Ft. Gordon, Ga. 30905, version 1.0, 8 Jul. 2013, the content of which is hereby incorporated by reference in its entirety.

Figure 1:
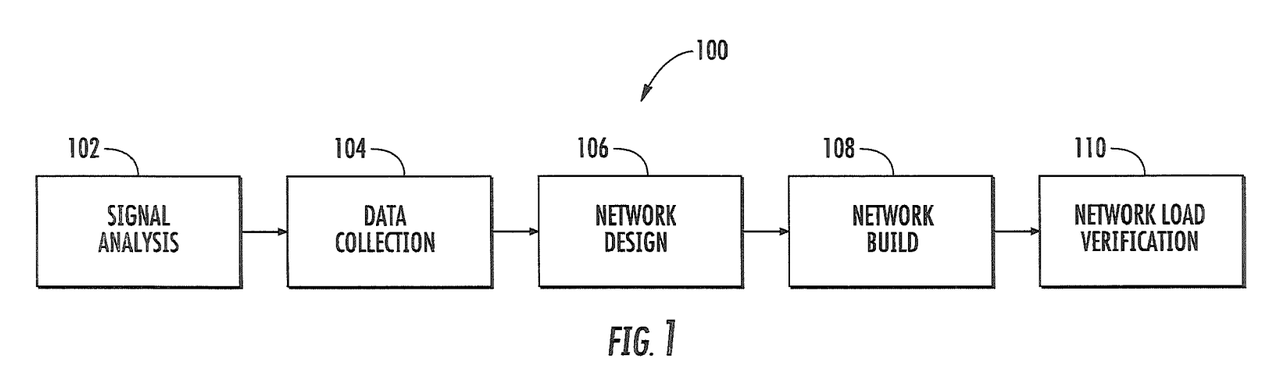
FIG. 1 is an illustration of an operational network planning system in accordance with example implementations of the present disclosure.

Referring now to FIG. 1, an operational network planning system 100 is illustrated according to example implementations of the present disclosure. The operational network planning system may be generally configured to bring together the different components of a network into a specific mission network design. The operational network planning system may be configured to cover a number of activities, including those from receipt of a commander's operations order to production of network device and application configuration files required to implement and execute the network, which in some examples may be further used for verification that the commander's network is initialized and fully operational.

The operational network planning system 100 may be configured to perform a number of different functions or operations, either automatically, under direct operator (or planner or user) control, or some combination of thereof. In this regard, the operational network planning system may be configured to perform one or more of its functions or operations automatically, that is, without being directly controlled by an operator such as operational personnel (e.g., signal officer) that may be assigned to plan a mission. Additionally or alternatively, the operational network planning system may be configured to perform one or more of its functions or operations under direct operator control.

The operational network planning system 100 may include one or more of each of a number of different subsystems (each an individual system) coupled to one another for performing one or more functions or operations. As shown in FIG. 1, for example, the operational network planning system may include a signal analysis system 102, data collection system 104, network design system 106, network build system 108 and/or network load/verification system 110. Although shown as part of the operational network planning system, one or more of the signal analysis system, data collection system, network design system, network build system and/or network load/verification system may instead be separate from but in communication with the operational network planning system. It should also be understood that one or more of the subsystems may function or operate as a separate system without regard to others of the subsystems. And further, it should be understood that the operational network planning system may include one or more additional or alternative subsystems than those shown in FIG. 1.

The signal analysis system 102 may be configured to receive a commander's approved mission course of action to include the approved Unit Task Organization (UTO). The UTO includes the hierarchy of units within military bounds (each unit a homogeneous military organization), and contains a hierarchical list of available units, radio platforms and radios (e.g., software defined radios (SDRs) for the communications/IT to plan. The signal analysis system may be focused on developing the radio frequency (RF) network configuration for the mission. This may include analysis of the terrain, available assets and mission objectives and produce a network plan to meet those objectives. The signal analysis system may provide an operator with a tool to allow them to easily quantify the available network assets and determine the best way of applying them across the platforms. As a tool, the signal analysis system may enable the operator to deal with issues such as RF environments (e.g., terrain, jammers, distance), required voice and application load (throughput), unit movement, and interoperability. The signal analysis system may provide a simple way to apply network assets and then evaluate the operational impact of the assignments (e.g., supported throughput, connectivity, interoperability).

More particularly, for example, the signal analysis system 102 may analyze the mission command requirements and translate them to produce a signal estimate. In some examples, the signal analysis system may use a number of mission variables, such as those of Mission, Enemy, Troops, Terrain, Time and Civilians (METT-TC), to identify specified tasks, implied tasks, network constraints, available assets and commander support requirements. The signal analysis system may use these specified and implied tasks, network constraints, available assets and commander support requirements to develop a signal support architecture (SSA) and radio platform preset architecture (RPPA), which may be included within the signal estimate.

In some examples, the signal analysis system 102 may provide a using a user-friendly GUI with a drag-and-drop interface through which the SSA may be developed. The GUI may support at least two stencil pallets. The first may represent the UTO and contain a hierarchical list of available units, radio platforms and radios for the communications/IT to plan. For this pallet, a number of symbols (e.g., 2525) may be used for unit and platform elements, and a generic symbol (e.g., circle) may be used for the radio. The second pallet may contain a set of symbols for network elements that are available for assignment, such as different waveforms (e.g., WNW, SRW, MUOS, SINCGARS) and other ancillary devices.

In some examples, development of the SSA may include the user placing (e.g., dragging) network elements (waveforms) onto a canvas in the GUI. The user may assign radios to the network elements, such as by placing (e.g., dragging and dropping) a radio or set of radios onto the waveform in the canvas. When a platform or unit is placed onto the network, all compatible radios within that platform or unit may be assigned to the network. The placement behavior may be constrained by a device properties file that contains a description of the capabilities for a specific radio variant. Examples of suitable capabilities include how many channels it can run, which waveforms it supports, what routing functionality it has, and the like. At a minimum, each supported radio may include a defined set of device properties. In practice, multiple variants may be included depending on the platform installation of the radio; when the radio is integrated into a vehicle-specific antennas and other line replaceable units (LRU's) are selected that further constrain the capability of the radio. In instances in which the radio supports two channels and route/retransmission, the user may drop the radio into two waveforms (if compatible) and create a gateway.

In some examples, selecting (e.g., double-clicking) a waveform on the SSA canvas may cause presentation of a set of questions that describe operation of that waveform. The questions may be worded in a tactical manner, and elicit answers intended to describe the RF environment for the waveform. Examples of suitable questions include network classification, operating frequency, bandwidth, the level of jamming threat, diversity tradeoff choices between throughput and reliability, the choice of network density from sparse to moderate and dense, the type of ground/air/water terrain, the urban versus non-urban development type, voice versus data application type, application domain choice, application configuration military scale (e.g., company versus platoon), and the like. A more particular example of a suitable question is "what type of terrain?," open and rolling, urban, dense forest, and so on.

The signal analysis system 102 may match the RF environment answers against a network scenario, which may automatically populate required waveform properties based off of the RF environment and the number of radios assigned to waveform. In some examples, multiple RF environments may be needed to support a single subnet. As an example, when the mission starts the unit may be sparsely populated in a non-urban open and rolling terrain; they may then enter a city where they become densely populated into urban canyons. The signal analysis system 102 may pre-plan the anticipated RF environment and allow an intuitive manner for the user to transition the same network name across these environments during mission operations.

In some examples, the SSA canvas may also support a zoom capability to allow transitioning the work area to meet the users work scope. In some examples, the zoom levels may be echelon based, including for example, individual radio, platform, platoon, company, battalion and the like. Zooming to a higher-order echelon may cause display of summary views and allow the user to perform operations across a large number of radios. For example, the user may desire to move an entire battalions set of radios from one brigade network to a different brigade network as part of a unit task reorganization. Zooming to a lower-level may allow the user to perform detailed changes, such as switching which radio acts as the network gateway within a specific platoon. This zoom capability may allow the signal analysis system 102 to support planning across different levels.

In addition to the SSA, the signal analysis system 102 may be used to develop a RPPA, which is responsible for turning the SSA into a preset list. This data product may dictate which presets/RF nets (waveforms) are loaded onto each radio in the mission. Typical structure may place all radios in an initial home network that will be their default preset. Additional presets may be added to support the mission needs. The signal analysis system may use a rules-based planning approach to perform these allocations. The signal analysis system may initially provide a sample set of platform preset rules that can be used to generate an architecture. One example of a suitable ruleset may be to place all radios in all nets (waveforms). This ruleset may leave a first preset as the home net, and then all other nets may be assigned. The preset assignment may be made to make sure that the preset numbers are aligned across the radios. As an example, preset #10 may be the same for all radios. A more sophisticated ruleset may be a one-up, two-down, plus-my-level-style ruleset. For this example, consider a company-level radio. This radio may be assigned a battalion net preset, all other company nets within this battalion, plus all platoon nets within this company. The signal analysis system may enable users to view, create, and import these rulesets.

Once a platform preset rule has been assigned to the mission, the signal analysis system 102 may enable the operator to manually navigate through the radios and view the assigned presets. The signal analysis system may enable the operator to manually update any assignments outside of the automatic assignments made by the rule set. And the signal analysis system may enable the operator to save and recall these modifications.

The data collection system 104 may be configured to receive the signal estimate from the signal analysis system 102, and collect data associated with the signal estimate required to build a detailed unit network design. At this point, the operator may have defined the basis for the network and be ready to request the data products to complete planning, although the operator need not always request additional data products. The data collection system may allow the operator to see the list of available items and notify the user if additional items are required. Examples of common items typically requested for each mission include keys and frequencies. Other examples of suitable data products are provided in the above-referenced and incorporated ITNE CONOPS.

In some examples, the data collection system 104 may automate data collection such as by implementing an electronic messaging between the operational network planning system 100 and one or more data product provisioning servers. For example, the operational network planning system may interface with an electronic key management system (EKMS) for keys. In some examples, then, the data collection system may provide a data collection configuration GUI or page and collect data over one or more networks. This GUI/page may allow the operator to update and change remote connection information such as IP address and port's used to perform the data collection.

In some examples, the SSA may be used to drive automated data requests. In this regard, the SSA may dictate the number and types of frequencies required to support the mission. For items such as the frequency, the data collection system 104 may contain a feedback loop for instances in which the number and type of received frequencies does not equal to the ones requested. In this case, the operator may be required to update the SSA to operate within the constraints of the allocated frequencies. For example, maybe the operator requested a 5 MHz channel, but was only granted a 3 MHz channel.

In some examples, the SSA may not contain all of the data required to initiate some of the automated data requests. In these examples, the data collection system 104 may support automated requests at multiple locations within the network planning workflow. An example may be that detailed IP information is not available until a Network Routing Architecture (NRA) portion of planning.

The network design system 106 may build on the signal analysis system 102 by overlaying network routing and services on top of the previously-defined transport architecture. The network design system may be configured to receive the collected data from the data collection system 104, and perhaps also the signal estimate from the signal analysis system 102. Using the data that it receives, the network design system may establish the IP layer, including formulating an IP scheme and a NRA. Although described in terms of IP, it should be understood that example implementations may be equally suited to any of a number of different network-layer protocols.

The network design system 106 may support assignment of IP addresses and routing protocols across the different radios and network devices. In addition, the network design system may facilitate planning interoperability with higher level network assets. The network design system may use sets of pre-defined templates to provide for easy network configuration. The NRA planning may be separated into three categories: protocols, multicast and unicast. The protocols category may be used to capture the detailed configuration for the routing protocols. The routing protocols may be considered an advanced capability; and consequently, the configuration details of the routing protocols may be hidden from the operator. The operator may select the correct protocol configuration via a name (e.g., "Default," "WIN-T Inc 1"). The name may define a superset of routing configuration optimized for interoperability across the systems. For the multicast/unicast categories, the network design system may provide a GUI that is able to handle IP assignments and groupings to radios at multiple levels; and for these categories, the operator may either assign a pool of addresses to an autonomous system or edit individual assignments.

The network design system 106 may finalize the SSA and the RPPA by application of the IP scheme, NRA, frequencies, narrowband Satellite Communications (SATCOM) and/or COMSEC data. The network design system may then generate a network design that includes the aforementioned and any other relevant or appropriate data, and which may at times be referred to as a communications plan (CommPlan). The CommPlan may include a variety of data such as the definition of a mission's phases, global parameters needed for the operation of multiple waveforms, waveform specific parameters, the layout RF radio network, and the definition of IP networks, and any additional parameter settings needed for radio operation.

The network design system 106 may finalize the aforementioned artifacts and output the network design in any of a number of different manners. In some examples, the network design system may employ scenario-based planning and rules-based planning. The operational network planning system 100 of example implementations takes a unique planning approach that offers a flexible framework to abstract the complexities of planning a tactical network.

The planning approach focuses on abstracting away the detailed configuration properties and redundant tasks allowing the operator to focus on the tactical decision making and optimizing asset deployment to maximize mission effectiveness. Two approaches used by operational network planning system are scenario-based planning and rules-based planning. In general, the operational network planning system focuses on the higher-level planning needed to produce complex large networks. In some examples, the operational network planning system 100 and its network design system 106 may allow for defining and setting up a large network, and expect that any required individual tweaks to nodes will be performed at a lower level.

The scenarios-based planning is utilized to translate tactical and environmental mission parameters into engineering network configurations. The operational network planning system 100 may match a series of tactical parameters to the correct set of engineering parameters. This approach may allow the user the ability to adjust and optimize their network configuration without understanding the details of the underlying parameters. This approach may be implemented by the signal analysis system 102, which may include a network scenarios engine, to allow the user to configure the transport architecture.

The rules-based planning may be implemented by the network design system 106 to translate common communication doctrine across the network. This approach may allow the user to define a set of rules to capture the doctrine and then have these rules applied across the network. This approach may allow the user to work at a higher doctrinal level rather than focusing on individual radios or units configuration. The network design system may include a rules engine with an intuitive and user-friendly design for building up, managing and assigning the different rule sets. In some examples, the network design system may allow the user to see the results of applying their rule set and make minor edits and save these changes.

The network build system 108 may be configured to receive the CommPlan from the network design system 106, and produce a mission configuration file (MCF) including network device and application configuration files required to implement and execute the network. In this regard, the network build system may also produce configuration files that may be loaded onto software defined radios, such as one or more Radio Configuration Files (RCF), Radio Mission Data Set (RMDS) files and the like. In some examples, the MCF may be manually tested and validated such as through direct access and observation. In other examples, the MCF may be tested and validated through automated simulation tools. In either event, the network build system may provide the MCF, which may be manually or automatically distributed to battalion units such as in support of follow-on network load operations and/or verification operations.

The network load/verification system 110 may be configured to perform or facilitate performance of a number of network load operations and/or verification operations. In some examples, these operations may include operational personnel loading mission network devices and mission command systems with their specific MCF, initializing the network, and conducting a communications check. One example of a suitable mission network device is a simple key loader (SKL) that may be used to carry and later load mission radio assets with radio-consumable files. In some examples, these operations may conclude with a commander approved operational network (OPNET) that meets and supports the identified information exchange requirements.

Some example implementations of the present disclosure may be provided by a tool for implementation of the signal analysis system 102 and network design system 106. In these example implementations, the tool may also implement the data collection system 104. In this regard, the tool may provide one or more GUIs to import data for the data collection system, or through which data may be manually entered into the data collection system. In order to be intuitive and easy to use for military operational personnel, the tool may utilize wording and nomenclature (e.g., ITNE CONOPS) that aligns with that understood by the personnel; and the tool may provide a flexible architecture that can be expanded to support additional network components. The tool of example implementations may output a CommPlan (implementing the network design system) for the network build system 108, which in some examples may be provided by another tool such as JENM to generate radio-consumable files such as the RCF, RMDS and the like. As suggested above, these radio-consumable files may be configuration files consumable by radios within the mission.

The tool of example implementations of the present disclosure may simplify tactical network planning by abstracting out the complexity of networked waveforms from the operational personnel. The tool may group a large number of configuration parameters into defined scenarios that may be selected as the result of answering a number of questions about network deployment, such as questions related to specifying the type of jamming, terrain data, network type and the like. The tool may establish common architectures that can be applied to a network without requiring the operational personnel to have a detailed understanding of those architectures. As evidenced in recent NIE events, tactical network planning may be subject to multiple levels of manual feeder data translation steps in which operational personnel captures the network layout vision using a graphical representation. The graphical representation then goes through multiple levels of translations during which further details are added as necessary. Operational personnel may be accustomed to Task Organization (TO) views centering around assigning available services to specific units and platforms, as oppose to network views revolving around capturing network elements and architecture. Using the tool of example implementations, the operational user may focus on a higher-level of network design utilizing TO views to meet mission objectives.

Figure 2:
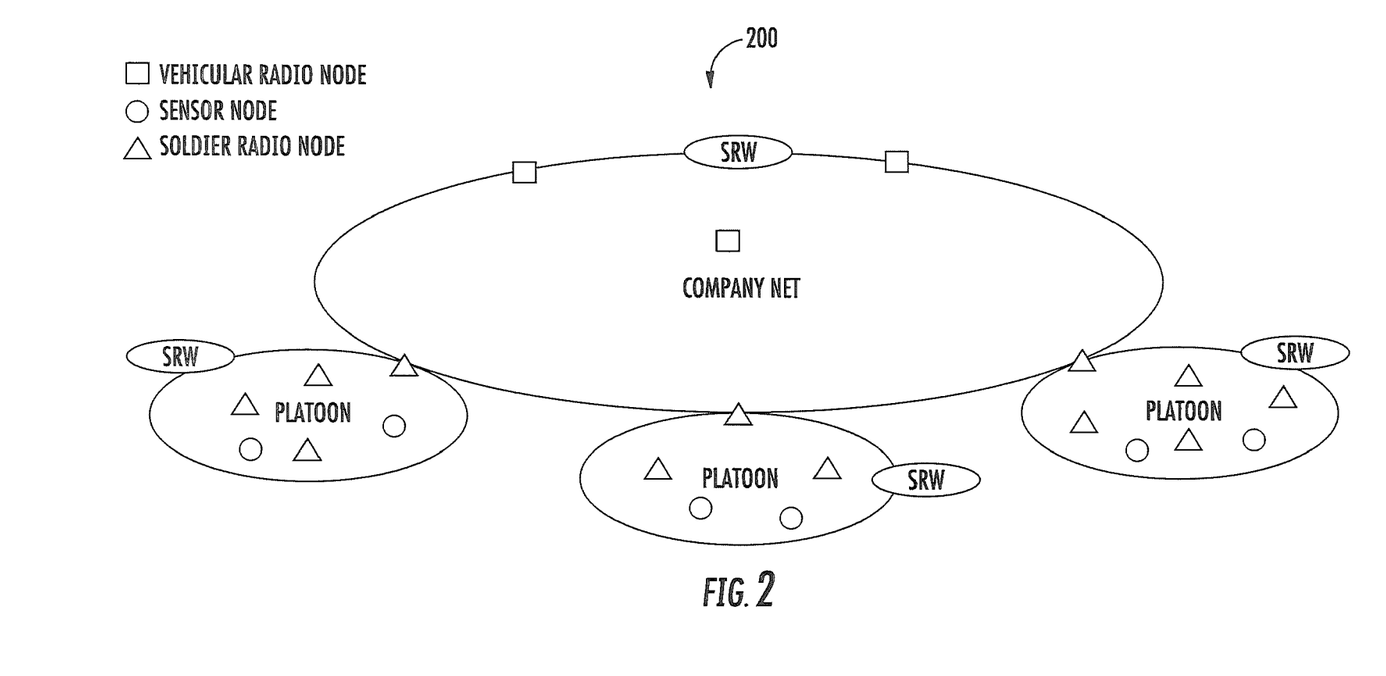
FIG. 2 illustrates an example Signal Support Architecture, according to some example implementations of the present disclosure.
Figure 3:
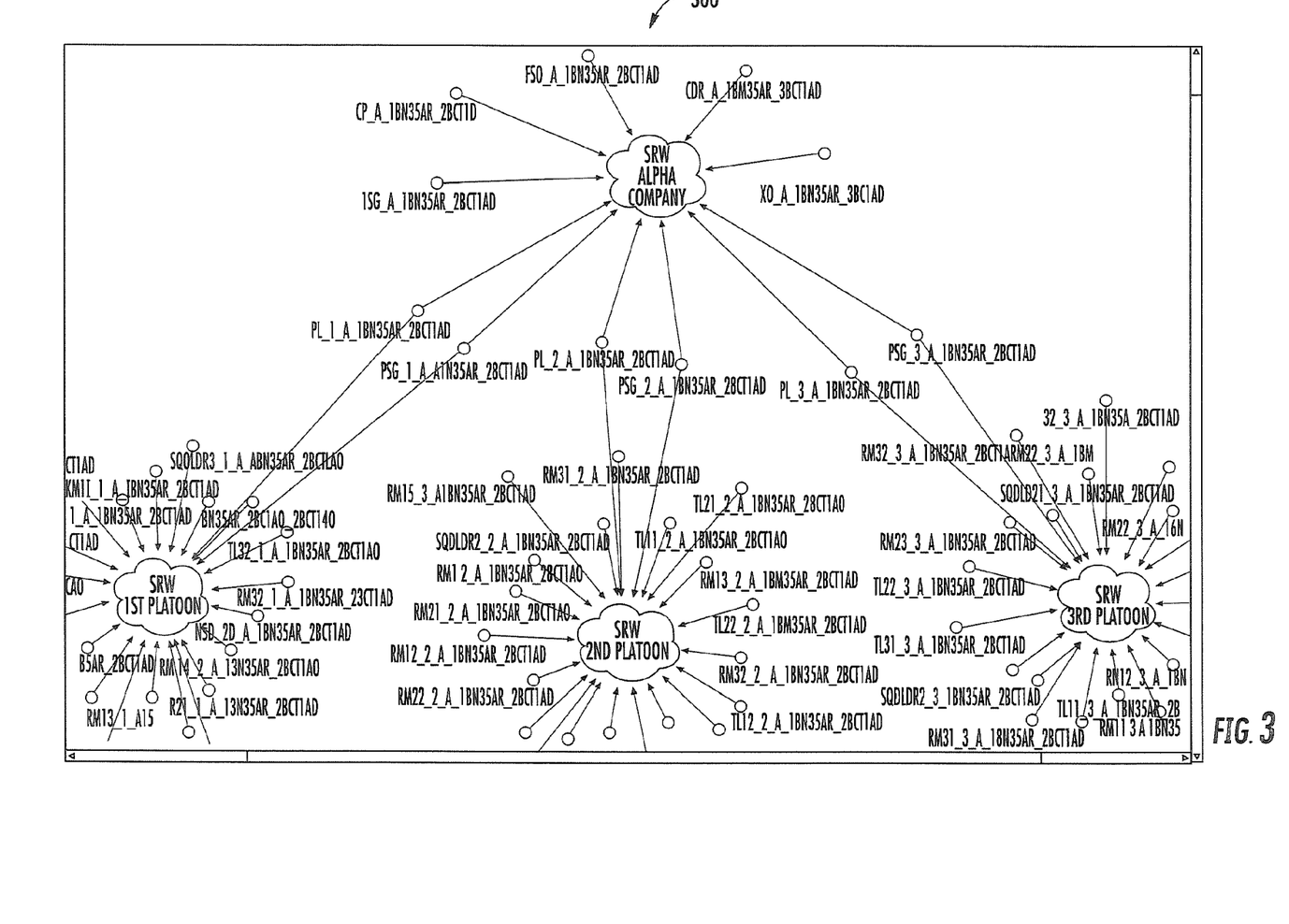
FIG. 3 illustrates an example drawing that may be provided by a tool of example implementations in the case of an SRW network.

FIG. 2 illustrates an example SSA 200, according to some example implementations of the present disclosure, and FIG. 3 illustrates an example drawing 300 that may be provided by the tool of example implementations in the case of an SRW network. As shown, the tool may allow for creating a meaningful drawing of the Transport Architecture and SSA relying on a user-friendly GUI that in some examples may mimic drawings provided by a commercially-available diagramming tool such as Microsoft Visio®. The tool may be able to capture metadata within the drawing to automatically generate a network plan. In this regard, the metadata may be structured information according to some metadata schema. By allowing for capturing the network architecture and generating network configuration files, the tool may reduce the operational user's work load and eliminate the need for multiple levels of translations.

Figure 4:
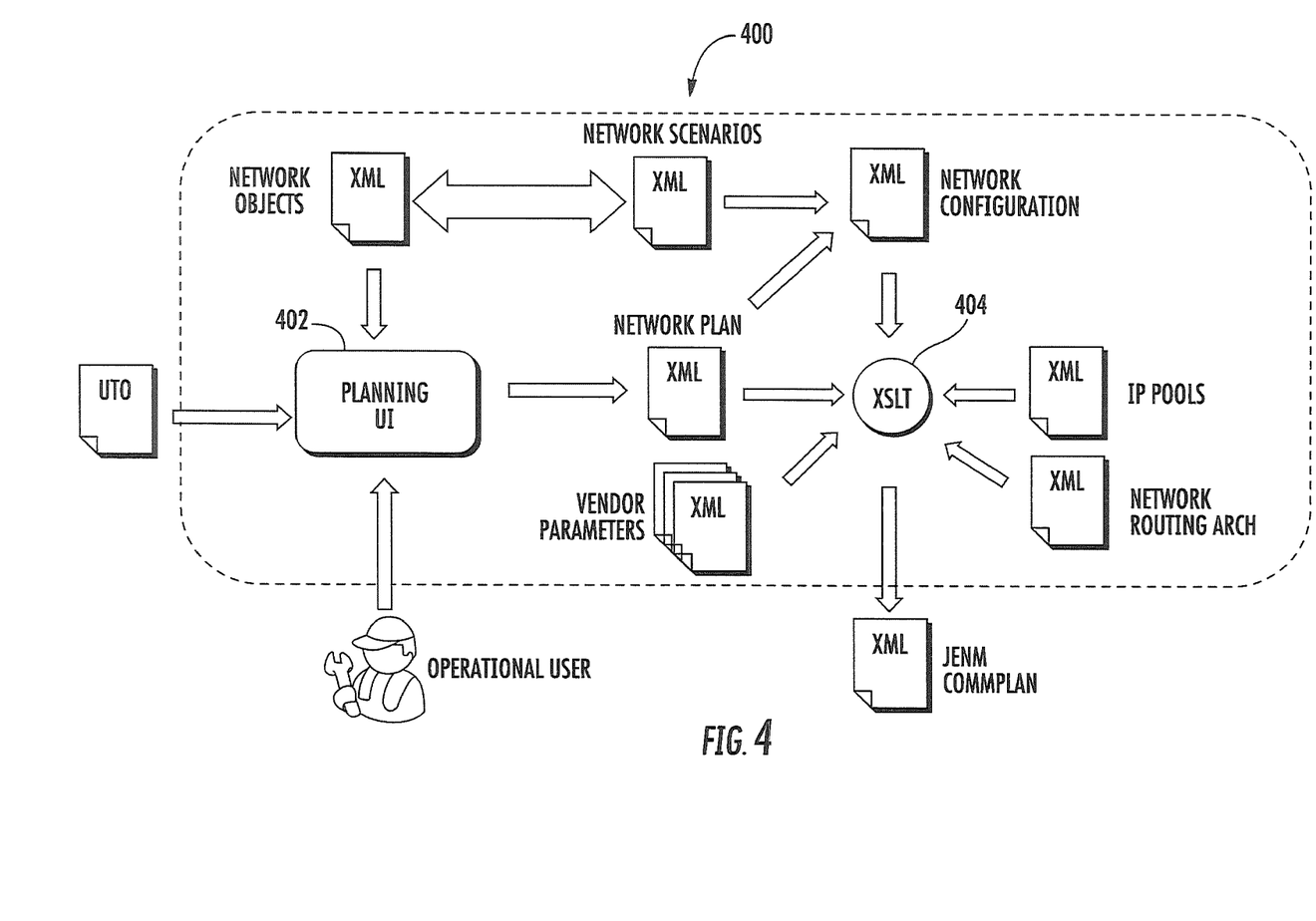
FIG. 4 illustrates various components of a tool, which in some example implementations of the present disclosure may be configured to implement various subsystems of the operational network planning system of FIG. 1.

FIG. 4 illustrates various components of a tool 400, which in some example implementations of the present disclosure may be configured to implement the signal analysis system 102, data collection system 104 and/or network design system 106 of FIG. 1. As shown, the tool may include a planning interface module 402 configured to allow an operational user access to the tool, and import the UTO data. The planning interface module may draw or be used by the operational user to draw network clouds of different waveforms, drag-and-drop UTO assets to network clouds at different levels of granularity, and designate common elements such as network gateways, such as is shown for example in FIG. 3. Each network cloud may be associated with a number of operationally relevant parameters, which in some examples may be initially set to default values. These parameters may include any of a number of different parameters such as those identified above. The parameters may be stored in network object files, which in some examples may be tied to a number of network scenarios, which may be in turn mapped to a number of network configuration templates specified based on the choice of parameters within the network object files.

Using the tool 400, planning a given mission may be reduced to drawing the network clouds, populating them with radio assets, specifying their connections through common links, and setting their operational parameters. Saving a graphically drawn mission may then result in generation of a Network Plan File (NPF) for that mission. This NPF may include components specifying the mission information, UTO, SSA and RPPA. Through the use of a modular architecture, each major component may be populated by a set of previously-defined files or relying on the input from the planning interface module 402. The latter may allow for incrementally expanding the coverage of parameter categories, while keeping the tool fully functional at each intermediate stage of development.

As explained above, the planning of a mission may also include formulation of an IP scheme and NRA, and it may include formulation of vendor-specific radio parameters. Following the same architectural approach, necessary inputs may be originally provided as default data sets to the tool 400, and may later be input through the planning interface module 402. The tool may also include a processing engine 404—such as an XML transformation engine (e.g., XSLT processing engine)—configured to process the mission's NPF along with the supporting files associated with network configuration, IP scheme, NRA, vendor parameters and the like to create an output file forming a CommPlan. While the tool of example implementations maybe implemented independent of individual network management products, the output CommPlan in some examples may be input to another tool such as JENM to generate radio-consumable files (e.g., RCF, RMDS).

Figure 5:
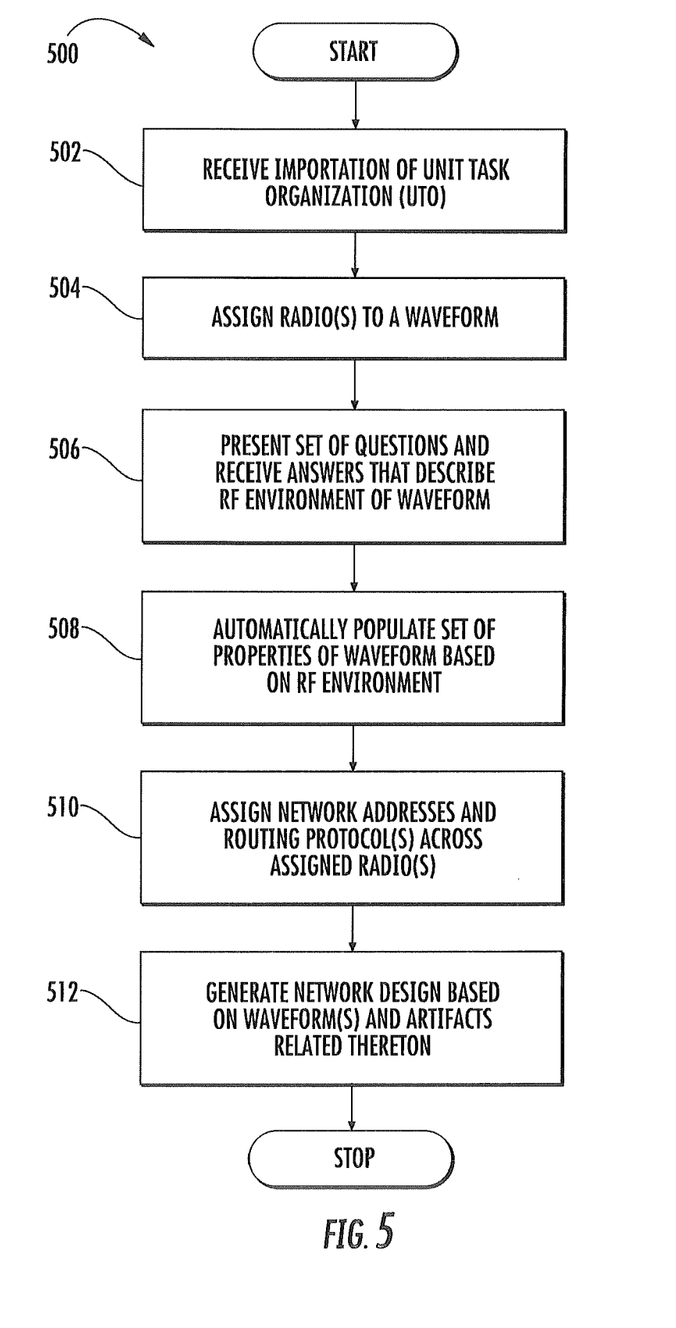
FIG. 5 is a flowchart illustrating various steps in a method for planning an operational network according to some example implementations.

FIG. 5 is a flowchart illustrating various steps in a method 500 for planning an operational network. As shown at block 502, the method may include receiving importation of a unit task organization for a mission. The method may include forming one or more waveforms to which radios are assigned based on the unit task organization, as shown at blocks 504, 506 and 508 for each of the waveform(s). That is, forming a waveform may include assigning one or more radios to the waveform, presenting a set of questions that elicit a set of answers that describe a radio frequency environment of the waveform, and receiving the set of answers in response thereto, as shown at blocks 504 and 506. Forming the waveform may also include automatically populating a set of properties of the waveform based on the radio frequency environment described by the set of answers, and based on a number of the one or more radios assigned to the waveform, as shown at block 508.

The method may also include assigning network addresses and one or more routing protocols across the radios assigned to the waveform(s), as shown at block 510. And as shown at block 512, the method may include generating a network design based on the waveform(s), and assigned radio(s) and automatically populated set of properties for each of the waveform(s), and based on the assigned network addresses and routing protocol(s). As explained above, the network design may be in the form of a communications plan in a format from which a radio-consumable file is producible.

According to example implementations of the present disclosure, the operational network planning system 100 and its subsystems including the signal analysis system 102, data collection system 104, network design system 106, network build system 108 and/or network load/verification system 110 may be implemented by various means. Similarly, the example tool 400 configured to implement the signal analysis system, data collection system and/or network design system, including each of its respective elements, may be implemented by various means according to example implementations. Means for implementing the systems, subsystems, tools and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 6:
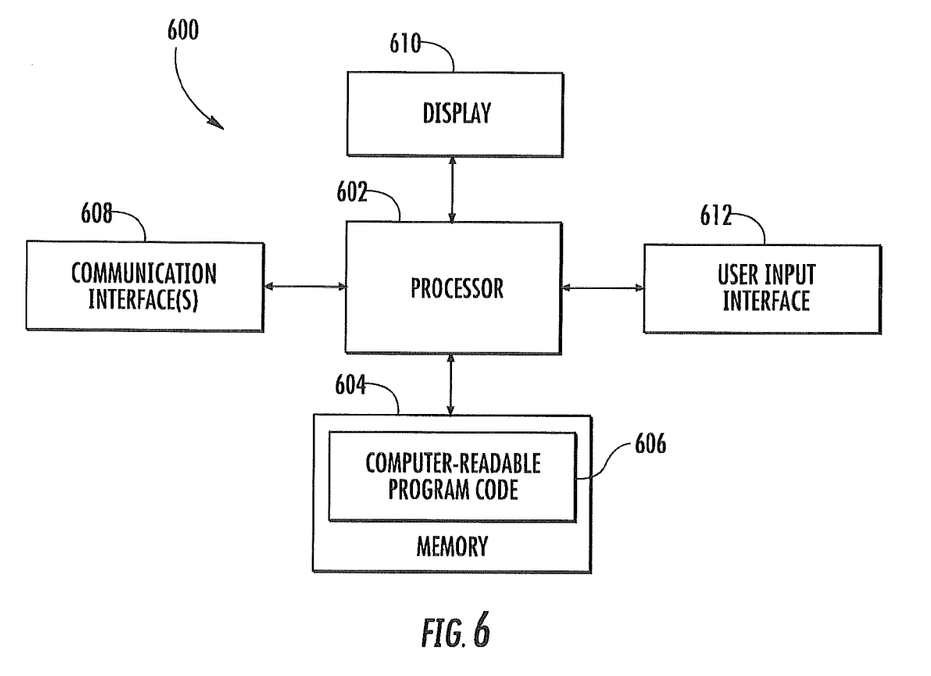
FIG. 6 illustrates an apparatus according to some example implementations.

FIG. 6 illustrates an apparatus 600 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 602 (e.g., processor unit) connected to a memory 604 (e.g., storage device).

The processor 602 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 604 (of the same or another apparatus).

The processor 602 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processor 602 may also be connected to one or more interfaces for displaying, transmitting and/or receiving information. The interfaces may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 602 and a computer-readable storage medium or memory 604 coupled to the processor, where the processor is configured to execute computer-readable program code 606 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of an operational network planning system, the apparatus comprising a processor and a memory storing executable instructions that in response to execution by the processor cause the apparatus to implement at least:
   a signal analysis system configured to receive importation of a unit task organization for a mission, and form one or more waveforms to which radios are assigned based on the unit task organization, including for each of the one or more waveforms, the signal analysis system being configured to:
      assign one or more radios to the waveform;
      present a set of questions that elicit a set of answers that describe a radio frequency environment of the waveform, and receive the set of answers in response thereto; and
      automatically populate a set of properties of the waveform based on the radio frequency environment described by the set of answers, and based on a number of the one or more radios assigned to the waveform; and
   a network design system configured to assign network addresses and one or more routing protocols across the radios assigned to the one or more waveforms, and generate a network design based on the one or more waveforms, and assigned one or more radios and automatically populated set of properties for each of the one or more waveforms, and based on the assigned network addresses and one or more routing protocols, the network design being in the form of a communications plan in a format from which a radio-consumable file is producible.

2. The apparatus of claim 1, wherein the memory stores further executable instructions that in response to execution by the processor cause the apparatus to further implement:
   a network build system configured to produce the radio-consumable file from the communications plan, the radio-consumable file including a mission configuration file.

3. The apparatus of claim 1, wherein the signal analysis system being configured to form the one or more waveforms includes being configured to develop a signal support architecture using capabilities of a graphical user interface (GUI), and the signal analysis system being configured to develop the signal support architecture includes for each of the one or more waveforms, the signal analysis system being configured to:
   receive placement of a waveform onto a canvas in the GUI, the waveform representing a partial implementation of a communication networking covering at least some layers of a multilayer protocol stack.

4. The apparatus of claim 3, wherein the signal analysis system being configured to assign one or more radios to the waveform includes being configured to receive placement of one or more radios onto a waveform on the canvas in the GUI to thereby assign the one or more radios to the waveform.

5. The apparatus of claim 3, wherein the signal analysis system being configured to present the set of questions includes for each of the one or more waveforms, the signal analysis system being configured to receive selection of a waveform on the canvas in the GUI and in response thereto, present the set of questions that elicit the set of answers that describe the radio frequency environment of the waveform.

6. The apparatus of claim 1, wherein the network design system being configured to assign network addresses and one or more routing protocols includes being configured to establish a network layer, including being configured to formulate a network scheme and a network routing architecture.

7. The apparatus of claim 6, wherein the signal analysis system being configured to form the one or more waveforms includes being configured to develop a signal support architecture and radio platform preset architecture based on the unit task organization, and
   wherein the network design system being configured to generate the network design includes being configured to apply the network scheme and network routing architecture to finalize the signal support architecture and radio platform preset architecture, and generate the network design based thereon.

8. A method for planning an operational network, the method comprising:
   receiving importation of a unit task organization for a mission;
   forming one or more waveforms to which radios are assigned based on the unit task organization, including for each of the one or more waveforms:
      assigning one or more radios to the waveform;
      presenting a set of questions that elicit a set of answers that describe a radio frequency environment of the waveform, and receiving the set of answers in response thereto; and
      automatically populating a set of properties of the waveform based on the radio frequency environment described by the set of answers, and based on a number of the one or more radios assigned to the waveform;
   assigning network addresses and one or more routing protocols across the radios assigned to the one or more waveforms; and
   generating a network design based on the one or more waveforms, and assigned one or more radios and automatically populated set of properties for each of the one or more waveforms, and based on the assigned network addresses and one or more routing protocols, the network design being in the form of a communications plan in a format from which a radio-consumable file is producible.

9. The method of claim 8 further comprising:
   producing the radio-consumable file from the communications plan, the radio-consumable file including a mission configuration file.

10. The method of claim 8, wherein forming the one or more waveforms includes developing a signal support architecture using capabilities of a graphical user interface (GUI), and developing the signal support architecture includes for each of the one or more waveforms:
    receiving placement of a waveform onto a canvas in the GUI, the waveform representing a partial implementation of a communication networking covering at least some layers of a multilayer protocol stack.

11. The method of claim 10, wherein assigning one or more radios to the waveform includes receiving placement of one or more radios onto a waveform on the canvas in the GUI to thereby assign the one or more radios to the waveform.

12. The method of claim 10, wherein presenting the set of questions includes for each of the one or more waveforms, receiving selection of a waveform on the canvas in the GUI and in response thereto, presenting the set of questions that elicit the set of answers that describe the radio frequency environment of the waveform.

13. The method of claim 8, wherein assigning network addresses and one or more routing protocols includes establishing a network layer, including formulating a network scheme and a network routing architecture.

14. The method of claim 13, wherein forming the one or more waveforms includes developing a signal support architecture and radio platform preset architecture based on the unit task organization, and
wherein generating the network design includes applying the network scheme and network routing architecture to finalize the signal support architecture and radio platform preset architecture, and generating the network design based thereon.

15. A computer-readable storage medium for planning an operational network, the computer-readable storage medium being non-transitory and having computer-readable program code portions stored therein that in response to execution by a processor, cause an apparatus to at least:
receive importation of a unit task organization for a mission, and form one or more waveforms to which radios are assigned based on the unit task organization, including for each of the one or more waveforms, the apparatus being caused to:
assign one or more radios to the waveform;
present a set of questions that elicit a set of answers that describe a radio frequency environment of the waveform, and receive the set of answers in response thereto; and
automatically populate a set of properties of the waveform based on the radio frequency environment described by the set of answers, and based on a number of the one or more radios assigned to the waveform; and
assign network addresses and one or more routing protocols across the radios assigned to the one or more waveforms, and generate a network design based on the one or more waveforms, and assigned one or more radios and automatically populated set of properties for each of the one or more waveforms, and based on the assigned network addresses and one or more routing protocols, the network design being in the form of a communications plan in a format from which a radio-consumable file is producible.

16. The computer-readable storage medium of claim 15 having further computer-readable program code portions stored therein that in response to execution by the processor, cause the apparatus to further:
produce the radio-consumable file from the communications plan, the radio-consumable file including a mission configuration file.

17. The computer-readable storage medium of claim 15, wherein the apparatus being caused to form the one or more waveforms includes being caused to develop a signal support architecture using capabilities of a graphical user interface (GUI), and the apparatus being caused to develop the signal support architecture includes for each of the one or more waveforms, the apparatus being caused to:
receive placement of a waveform onto a canvas in the GUI, the waveform representing a partial implementation of a communication networking covering at least some layers of a multilayer protocol stack.

18. The computer-readable storage medium of claim 17, wherein the apparatus being caused to assign one or more radios to the waveform includes being caused to receive placement of one or more radios onto a waveform on the canvas in the GUI to thereby assign the one or more radios to the waveform.

19. The computer-readable storage medium of claim 17, wherein the apparatus being caused to present the set of questions includes for each of the one or more waveforms, the apparatus being caused to receive selection of a waveform on the canvas in the GUI and in response thereto, present the set of questions that elicit the set of answers that describe the radio frequency environment of the waveform.

20. The computer-readable storage medium of claim 15, wherein the apparatus being caused to assign network addresses and one or more routing protocols includes being caused to establish a network layer, including being caused to formulate a network scheme and a network routing architecture.

21. The computer-readable storage medium of claim 20, wherein the apparatus being caused to form the one or more waveforms includes being caused to develop a signal support architecture and radio platform preset architecture based on the unit task organization, and
wherein the apparatus being caused to generate the network design includes being caused to apply the network scheme and network routing architecture to finalize the signal support architecture and radio platform preset architecture, and generate the network design based thereon.

* * * * *